United States Patent [19]

Cherbuy

[11] Patent Number: 4,787,256
[45] Date of Patent: Nov. 29, 1988

[54] RESISTANCE-GAUGE FORCE TRANSDUCER

[75] Inventor: Jean Cherbuy, Nice, France

[73] Assignee: Sfernice Societe Francaise de l'Electro-Resistance, Paris, France

[21] Appl. No.: 42,653

[22] Filed: Apr. 28, 1987

[30] Foreign Application Priority Data

Apr. 30, 1986 [FR] France ............................. 86 06298

[51] Int. Cl.⁴ .............................................. G01L 1/22
[52] U.S. Cl. ................................. 73/862.67; 73/765; 73/862.65
[58] Field of Search ............ 73/767, 765, 766, 862.04, 73/862.63, 862.65, 862.66, 862.67; 177/211

[56] References Cited

U.S. PATENT DOCUMENTS 3,116,469 12/1963 Wu .
3,949,603 4/1976 Laimins ........................ 73/862.67 X
4,657,097 4/1987 Griffen ................................ 177/211

FOREIGN PATENT DOCUMENTS 0153121 8/1985 European Pat. Off. .
0175912 4/1986 European Pat. Off. .
WO84/02186 6/1984 Int'l Pat. Institute .

Primary Examiner—Charles A. Ruehl
Attorney, Agent, or Firm—Young & Thompson

[57] ABSTRACT

A resistance-gauge force transducer comprises a resilient bar having one end adapted to be fixed to a stationary support and the other end subjected to the force to be measured. The bar carries two pairs of resistance gauges symmetrically disposed on both sides of the center of gravity of the bar. The direction of the lines of current of a gauge of one pair is parallel to the bar axis and perpendicular to that of the other gauge of the same pair. The gauges are electrically connected together so as to form a wheatstone bridge delivering a signal which is a function of the force applied to the end of the bar. The two gauges of one pair are adjacent and connected to each other in the wheatstone bridge. This arrangement renders the force transducer insensitive to thermal variations.

3 Claims, 2 Drawing Sheets

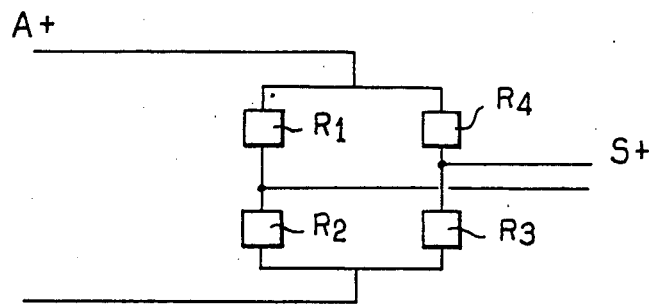
FIG_1
PRIOR ART
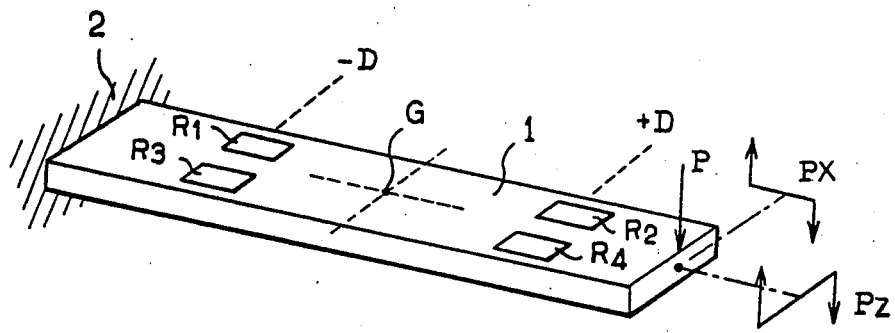
FIG_2
PRIOR ART
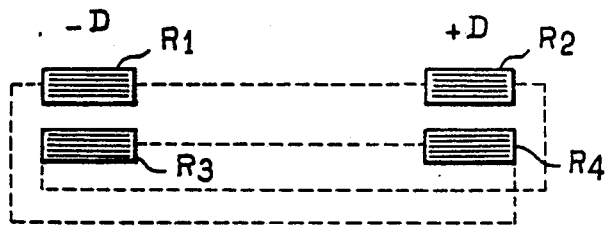
FIG_3
PRIOR ART

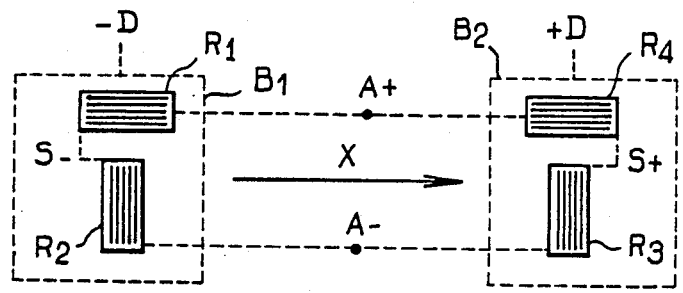
FIG_4
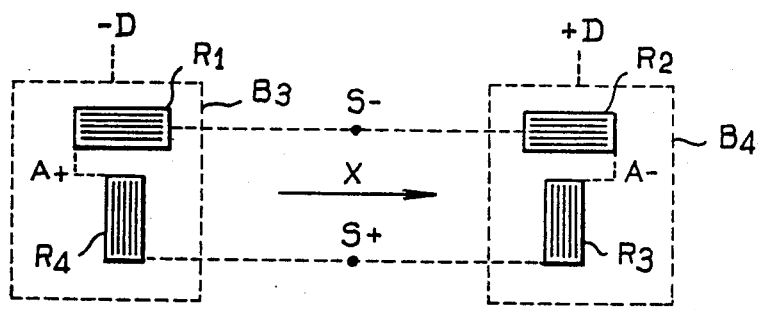
FIG_5
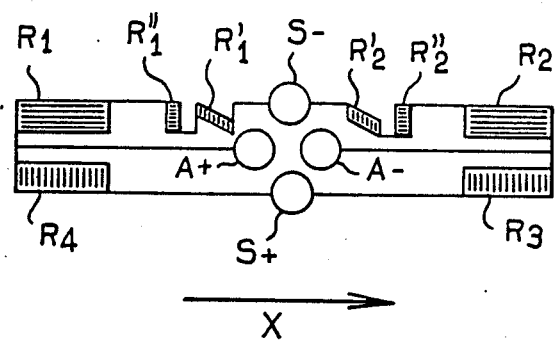
FIG_6

RESISTANCE-GAUGE FORCE TRANSDUCER

The present invention concerns a resistance-gauge force transducer wherein the signal in the absence of charge ("zero") is unaffected by temperature variations.

Transducers of the above-mentioned type are already known in which one end of a resilient metal bar is attached to a stationary support and the other end is subjected to the force to be measured. This force is usually applied to a plate which is parallel to the bar and connected to this latter at the end remote from the stationary support.

The fixed bar carries resistance-type strain gauges that are electrically connected to each other and form a measuring bridge delivering an electrical signal which is a function of the force applied to the above-mentioned plate.

Depending on the point of application of this force on the plate, this force creates variable torsional and flexural couples which act on the bar and modify the value of the electric signal delivered by the measuring bridge and thus alter the measurement of this force.

Appropriate steps need therefore be taken to make this measurement insensitive to the above-mentioned parasitic couples, so as to ensure that the signal delivered is constant irrespective of the point of application of the force on the plate.

Two methods are at present in use for ensuring insensitivity of force measurement relative to the above-mentioned parasitic couples.

In a first method, the plate rests on a system of levers which adds up the forces applied to the plate and transmits the resultant force on a predetermined point to the measuring device.

In a second method, the plate is attached directly to a transducer which is often of a highly complex shape, and so designed as to minimize the effect of the parasitic couples or moments; the transducer is usually adjusted by mechanical actions for eliminating residual effects of the parasitic moments.

In the method described in French Pat. No. 82 20040, an attempt has been made to solve the above-mentioned disadvantages by eliminating the parasitic torsion signal generated at the time of application of force on the plate by means of one or several torsion strain gauges and of suitable additional resistors inserted in the signal-processing circuit.

However, this method does not permit eliminating the parasitic signal which is related to the displacement of the point of application of the force in a direction parallel to the axis of the resilient bar.

In French patent application No. 85 05337 filed Apr. 5, 1985 by the present applicant, there was described a method for adjusting the force transducer such that the electrical measurement system is insensitive to the torsional and flexural couples generated by displacements of the point of application of the force to be measured on the bar carrying the gauges.

This method comprises the following steps:

A. Determination of the initial characteristics of the transducer,

B. Calculation of the relative errors of the transducer arising from a displacement of the applied force as a function of the angle $\theta$ formed between the resistance gauges and the longitudinal extent of the bar, C. Cancellation of these errors by making modifications in one or a number of resistance gauges in order to produce a modification of the above-mentioned angle $\theta$.

The present applicant has in fact found that it was possible to compute the relative errors of the transducer arising from displacements of the applied force as a function of the angle $\theta$ formed between the resistance gauges and the resilient bar.

It is therefore possible to cancel these errors by making modifications in one or a plurality of resistance gauges, the effect thereby achieved being to modify the above-mentioned angle $\theta$.

The method according to that invention thus permits obtaining in a single sequence of operations involving solely a modification of the angle $\theta$ formed by one or several resistance strain gauges, a force transducer delivering a signal strictly proportional to the force to be measured, irrespective of the point of application of this force relative to the bar.

Given that the method acts on a modification in only one parameter of the resistance gauges, this method may be easily automated.

In conventional embodiments, four resistance gauges $R_1 = R_2 = R_3 = R_4$ are disposed on a surface of a resilient metallic bar and are electrically connected together according to a Wheatstone bridge as shown in the accompanying FIG. 1, in which the supply is referenced $A+$ and the output $S+$.

As shown in FIG. 2, two groups formed respectively by the gauges $R_1$, $R_3$ and gauges $R_2$, $R_4$ are placed at an abscissa $-D$ and $+D$ from the center of gravity G of the resilient bar 1. In each one of these two groups, the gauges $R_1$, $R_3$ or $R_2$, $R_4$ are of the same parity (that is, not connected to each other in the Wheatstone bridge diagram) as indicated in FIG. 3.

When a force P is applied to the end of the bar 1 remote from the stationary body 2 to which the bar 1 is fixed, the electrical signal produced at the output $S+$ of the Wheatstone bridge has the form:

$$APGD + z$$

in which:

$$A = 1/(EI/v),$$

wherein
E is the modulus of elasticity of the bar,
I is its moment of inertia, and
v is the half-thickness of the bar;
G being a constant called the "gauge coefficient" and z representing the signal (ideally nil) due to the disequilibrium of the measuring bridge in the absence of applied force (this signal is hereinafter designated "zero").

The variation of the zero signal is given by the measuring bridge equation:

$$dz = \tfrac{1}{4}(r_1 - r_2 + r_3 - r_4),$$

wherein $r_i = (\Delta R_i/R_i$ ($R_i$ being the electric resistance of gauge i) and is essentially a function of the temperature and the duration.

This description will hereinafter be limited for the sake of simplicity to the influence of temperature, the influence of duration being treated in an analogous manner. Consequently, it will be admitted that dz represents the thermal deviation of the zero.

The thermal deviations of the gauge resistances $R_1$, $R_2$, $R_3$, $R_4$ disturb the signal and it is therefore necessary to eliminate dz. This is usually done by inserting high temperature coefficient resistors of an appropriate value in series with a gauge of suitable parity. This operation is costly, and therefore unacceptable for producing an economical force transducer.

A method more suitable for producing economical force transducers consist of selecting groups of gauges having almost identical thermal properties. Such selection is nevertheless still an economic constraint. Moreover, it is not entirely effective, like the preceding method, if there exists a longitudinal temperature gradient.

The object of the present invention is to provide a resistance-gauge force transducer having a zero signal that is insensitive to temperature variations over time and insensitive to the existence of a thermal gradient along the bar.

The present invention relates to a resistance-gauge force transducer, this transducer comprising a resilient bar having one end adapted to be fixed to a stationary support and the other end subjected to the force to be measured, this bar carrying resistance gauges electrically interconnected so as to form a measuring bridge delivering an electric signal which is a function of the force applied on the said end of the bar, this transducer being adjusted such that the signal is proportional to the force applied and insensitive to torsional and flexural couples created by displacements of the point of application of the force to be measured.

According to the invention, this force transducer is characterized in that the bar comprises two groups of gauges disposed symmetrically on both sides of the center of gravity (G) of the bar, in that the gauges of each group have opposite parities and in that the electric length of a gauge is perpendicular to that of the adjacent gauge of the same group.

The electric length means the direction of the lines of current of a gauge.

The thermal deviations of two resistance gauges of the same group are always equal if:

(a) The temperature coefficients of these gauges are equal. These coefficients represent the thermal variations of the resistivity of the alloy used for making the gauges and the thermal variations of the dimensions of the gauge, themselves related to the thermal variations of the dimensions of the substrate on which they are fixed.

(b) The temperature variations $\Delta\theta$ of these resistances are equal.

These two conditions are best realized if the two gauges are formed from the same small quantity of resistant alloy, remain contiguous during all the stages of their manufacture and are simultaneously fixed on the same small area of the bar, that is to say form a small group on the metallic bar of the force transducer.

Other features and advantages of the invention will further emerge in the following description.

In the accompanying drawings, given by way of non-limiting example:

FIG. 1 shows schematically the conventional arrangement of the resistance gauges according to a Wheatstone bridge, FIG. 2 is a schematic view of a conventional force transducer comprising a resilient bar wherein one of its surfaces carries resistance gauges, FIG. 3 schematically shows how the gauges of FIG. 2 are electrically interconnected, FIG. 4 shows the arrangement of the gauges according to a first embodiment of the invention, FIG. 5 shows the arrangement of the gauges according to a second embodiment of the invention, FIG. 6 shows the arrangement of the gauges in a preferred embodiment of the invention.

The resistance gauges $R_1$, $R_2$, $R_3$, $R_4$ of the present invention are constituted for example by a thin sheet of resistive alloy such as nickel-chrome, in which has been etched by chemical attack or ionic bombardment, thin resistive filaments. In the conventional arrangement (see FIG. 3) the resistive filaments of the gauges $R_1$, $R_2$, $R_3$, $R_4$, are all oriented in the same direction.

When an off-center force P is applied to the resilient bar 1 (see FIG. 2), this latter is subjected to flexural couple PX and torsional couple PZ.

In the conventional arrangement described above and shown in FIG. 2, gauges $R_1$ and $R_3$ form a group at the abscissa $-D$ and $R_2$ and $R_4$ form another group at the abscissa $+D$.

The temperature coefficients of the gauges may be written as follows:

$$\alpha_1 \equiv \frac{\alpha_1 + \alpha_3}{2} + \frac{\alpha_1 - \alpha_3}{2} = \alpha_{13} + \delta_{13};$$

$$\alpha_3 \equiv \frac{\alpha_1 + \alpha_3}{2} - \frac{\alpha_1 - \alpha_3}{2} = \alpha_{13} - \delta_{13}$$

similarly: $\alpha_2 \equiv \dfrac{\alpha_2 + \alpha_4}{2} + \dfrac{\alpha_2 - \alpha_4}{2} = \alpha_{24} + \delta_{24};$ $$\alpha_4 \equiv \frac{\alpha_2 + \alpha_4}{2} - \frac{\alpha_2 - \alpha_4}{2} = \alpha_{24} - \delta_{24}$$

and it may also be written that at the abscissa $-D$, the temperature is: $\theta_{13} = \theta + \Delta$ whereas at the abscissa $+D$, the temperature is: $\theta_{24} = \theta - \Delta$ wherein $\theta$ is the mean temperature of the bar 1 and $\Delta$ is half the difference of the temperature between the abscissas $-D$ and $+D$. The thermal deviation may thus be calculated:

$$dz = \frac{1}{4}[(r_1 + r_3) - (r_2 + r_4)]$$

$$4\,dz = (\alpha_{13} + \delta_{13} + \alpha_{13} - \delta_{13})(\theta + \Delta) -$$

$$(\alpha_{24} + \delta_{24} + \alpha_{24} - \delta_{24})(\theta - \Delta) =$$

$$2\alpha_{13}(\theta + \Delta) - 2\alpha_{24}(\theta - \Delta)$$

consequently:

$$dz = \frac{1}{2}(\alpha_{13} - \alpha_{24})\theta + \frac{1}{2}(\alpha_{13} + \alpha_{24})\Delta$$

The thermal deviation dz of the zero signal depends on the mean coefficients of temperature ($\alpha_{13}$ and $\alpha_{24}$) of the groups ($R_1$, $R_3$ and $R_2$, $R_4$).

In order that a homogeneous heating ($\Delta = 0$) produces a deviation dz of the zero signal less than $1 \times 10^{-6}$, for example, over a temperature range of $\theta = 20°$ C., it is necessary to fulfill the following condition:

$$\alpha_{13} - \alpha_{24} < 0.1 \times 10^{-6}/°K.$$

which necessitates the above-described precautions.

Even with these precautions, and considering that the temperature coefficients are of the same sign, if a temperature gradient exists along the bar 1, deviations dz of the zero signal of a considerable magnitude are easily obtained.

The bridge configuration according to the present invention for minimizing deviation of the zero signal, arranges two resistance gauges ($R_1$, $R_2$; $R_3$, $R_4$) of opposite parities in the same group. Thus, the thermal deviations are substantially cancelled interiorly of each group. Specifically, in this case, the following two solutions exist:

$$4dz = (r_1 - r_2) + (r_3 - r_4) \approx 0 + 0$$

or $$4dz = (r_1 - r_4) + (r_3 - r_2) \approx 0 + 0$$

More precisely, with the notations already employed for the conventional configuration described with reference to FIG. 2:

$$4dz = (\alpha_{12} + \delta_{12} - \alpha_{12} + \delta_{12})(\theta + \Delta) + (\alpha_{34} + \delta_{34} - \alpha_{34} + \delta_{34})(\theta - \Delta)$$

therefore:

$$dz = \tfrac{1}{2}(\delta_{12} + \delta_{34})\theta + \tfrac{1}{2}(\delta_{12} - \delta_{34})\Delta$$

or $$4dz = (\alpha_{14} + \delta_{14} - \alpha_{14} + \delta_{14})(\theta + \Delta) + (\alpha_{32} + \delta_{32} - \alpha_{32} + \delta_{32})(\theta + \Delta)$$

therefore:

$$dz = \tfrac{1}{2}(\delta_{14} + \delta_{32})\theta + \tfrac{1}{2}(\delta_{14} - \delta_{32})\Delta$$

One verifies that the thermal deviations of the zero signal (dz) no longer depend on the mean temperature coefficients (TC) of the groups, but solely on the difference "$2\delta$" of the temperature coefficients interiorly of the groups, the sign of the $\delta$ being random.

For distances on the order of a few millimeters between the two gauges of a group, this difference is at most on the order of $0.1 \times 10^{-6}/°K.$, such that $$|\delta_{14} + \delta_{32}| \leq 1 \times 10^{-6}$$

If $\theta = 20°$ as in the example given for the conventional configuration, there is obtained a thermal deviation dz less than $\tfrac{1}{2} (0.1 \times 10^{-6}) 20 = 1 \times 10^{-6}$, without special precautions.

If a temperature gradient $\Delta$ exists between the two groups of gauges, the thermal deviation dz remains less than $0.05 \Delta 10^{-6}$.

The two gauges $R_1$, $R_2$: $R_3$, $R_4$ being of opposite parities in each group, maximum signal is obtained with the measures described in applicant's French Pat. No. 85 05337.

In French Pat. No. 85 05337, applicant established the variation of the value of a resistance forming an angle $\theta$ with the longitudinal extent of the bar 1 subjected to a force situated at a distance X from the center of gravity G of the bar 1 along its longitudinal axis and at a distance Z perpendicular to this axis.

This variation is:

$$(\Delta R/R) = r = AP[G(X-x) + (1+\mu)(\cos 2\theta - 1)(X-x) + BZ \sin 2\theta]$$

$$r_i = AP[(G-(1+\mu))(-x_i) + (1+\mu)C_i(-x_i + (G-(1+\mu))X + (1+\mu)C_iX + BS_iZ]$$

wherein:

A and B are mechanical characteristics of the bar 1
G is the gauge coefficient
$C_i = \cos 2\theta_i$
$S_i = \sin 2\theta_i$
$x_i =$ abscissa of the resistance i The signal of the Wheatstone bridge is (neglecting the second order terms):

$$\text{Signal} = \alpha(r_1 - r_2) + \beta(r_3 - r_4)$$

wherein $\alpha = a/(1+a)^2$, $\beta = b/(1+b)^2$, $a = R_1/R_2$, $b = R_4/R_3$ (In practice $\alpha$ and $\beta$ are very close to $\tfrac{1}{4}$ when all the resistances of the gauges have the same value.)

(1) Let $x_1 = x_2 L32 -D$ and $x_3 = x_4 = D$ $$\text{Signal} = AP[0 + (1+\mu)(\alpha(C_1 - C_2) - \beta(C_3 - C_4))D + 0 + (1+\mu)(\alpha(C_1 - C_2 + \beta(C_3 - C_4))X + B(\alpha(S_1 - S_2) + \beta(S_3 - S_4))Z] + z$$

This signal is at a maximum for $C_1 = C_4 = 1$; $C_2 = C_3 = -1$ or $\theta_1 = \theta_4 = 0$ and $\theta_2 = \theta_3 = \pi/2$, consequently the signal is equal to:

$$AP[(1+\mu)(\alpha+\beta)2D + (1+\mu)(\alpha-\beta)2X] + z$$

This arrangement is shown in FIG. 4. The gauges $R_1$, $R_2$ of one of the groups have different parities, that is to say are connected to each other in the Wheatstone bridge. Similarly, gauges $R_3$ and $R_4$ are of different parities. References A+ and A- respectively designate the positive and negative supply terminals of the Wheatstone bridge, whereas S+ and S- designate the + and - output terminals. X represents the longitudinal axis of the bar 1.

It can also be seen from the diagram of FIG. 4 that the resistive filaments constituting gauges $R_1$ and $R_4$ form an angle $\theta = 0$ with the axis X, whereas the resistive filaments of the gauges $R_2$ and $R_3$ form an angle $\theta = \pi/2$ with this axis X.

(2) Let $x_1 = x_4 = -D$ and $x_2 = x_3 = D$ $$\text{Signal} = AP[(G-(1+\mu)(\alpha-\beta))2D + (1+\mu)(\alpha(C_1+C_2) - \beta(C_3+C_4))D + (1+\mu)(\alpha(C_1-C_2) + \beta(C_3-C_4))X - + B(\alpha(S_1+S_2) + \beta(S_3-S_4))Z] + z$$

This signal is maximum for $C_1 = C_2 = 1$ and $C_3 = C_4 = -1$ or $\theta_1 = \theta_2 = 0$; $\theta_3 = \theta_4 = \pi/2$; consequently the signal is equal to:

$$AP[(G-(1+\mu)(\alpha-\beta))2D + (1+\mu)(\alpha+\beta)2D] + z$$

This arrangement is shown in FIG. 5.

This latter arrangement is preferred as it does not contain the term X $(\alpha - \beta)$ present in the first arrangement, which in principle complicates adjustment of the transducer. The arrangement of FIG. 4 is converted to the arrangement of FIG. 5 simply by inverting the supplies A+ and A- and outputs S+ and S- of the Wheatstone bridge.

If, according to French Pat. No. 85 05337, there is disposed in series with each one of the gauges $R_1$ and $R_2$ of two different groups, as indicated in FIG. 6:

a small adjustable resistance $R'_1$ of weight $\rho'_1 = R'_1/(R_1+R'_1)$ (and $R'_2$ of weight $\rho'_2$) forming an angle $\theta = -\pi/4$ with respect to the axis X of the bar 1, and another adjustable resistance $R''_1$ of weight $\rho''_1$ (and $R''_2$ of weight $\rho''_2$), forming an angle $\theta = \pi/2$ with respect to the axis X, the coefficients $C_1$ and $C_2$ of the above relation become $1-\rho'_1-2\rho''_1$ and $1-\rho'_2-2\rho''_2$ instead of 1, $S_1$ and $S_2$ become $-\rho'_1$ and $-\rho'_2$ instead of 0, $C_3$ and $C_4$ remain equal to $-1$ and $S_3$ and $S_4$ equal to 0, and the coefficients Z and X in the expression for the signal may be modified at will, with the simplification $\alpha = \beta = \frac{1}{4}$, which gives:

Signal =

$$AP\left[(1+\mu)D - \frac{1+\mu}{4}(\rho'_1 + \rho'_2 + 2\rho''_1 + 2\rho''_2)D - \frac{1+\mu}{4}(\rho'_1 - \rho'_2 + 2\rho''_1 - 2\rho''_2)X - \frac{B}{4}(\rho'_1 - \rho'_2)Z\right] + z$$

There is thus obtained a force transducer insensitive to the thermal deviation dz, but the signal of which is also insensitive to torsional and flexural couples caused by displacements of the point of application of the bar 1 of the force P to be measured.

By way of comparison, the signal of the conventional bridge shown in FIGS. 2 and 3 provided with adjustment resistances on $R_1$ and $R_2$ is equal to:

Signal =

$$AP\left[GD - \frac{1+\mu}{4}(\rho'_1 + \rho'_2 + 2\rho''_1 + 2\rho''_2)D - \frac{1+\mu}{4}(\rho'_1 - \rho'_2 + 2\rho'_1 - 2\rho'_2)X - \frac{B}{4}(\rho'_1 - \rho'_2)Z\right] + z$$

It is thus verified that the automatic thermal stability of the "zero" signal causes in the case of the invention a reduction of the signal according to the ratio:

$$\frac{1+\mu}{G} \simeq \frac{1.3}{2} = 0.65,$$

which is negligible.

The adjustment procedure is identical for the two above examples.

It is also important to note that the arrangement shown in FIG. 5 is a circuit that permits easy integration of all the connections between the resistance gauges of the bridge, as shown in FIG. 6.

It will be understood that the invention is not limited to the examples that have just been described, and may include in these latter numerous modifications without departing from the scope of the invention.

Thus, the resistance gauges such as $R_1$ and $R_2$, instead of being placed close to each other perpendicularly to the longitudinal axis X of the bar, could be placed close to each other along this axis X, provided that the resistance gauges of the other group remain disposed symmetrically to the first group relative to the center of gravity G of the bar.

It will be understood that the adjustment of the force transducer so as to make it insensitive to torsional and flexural couples caused by displacements of the point of application of the force P on the bar 1 could be effected by any other means than the additional resistances such as $R_1'$, $R_1''$ and $R_2'$ and $R_2''$ (see FIG. 6), as described in applicant's French Pat. No. 85 05337.

The resistance gauges, described as formed from etched filaments, may be layered resistances; the word "filament" is thus to be understood as "electrical resistance length".

What is claimed is:

1. Resistance-gauge force transducer, comprising a resilient bar (1) having one end adapted to be fixed to a stationary support (2) and the other end subjected to the force (P) to be measured, wherein the bar carries two pairs of resistance gauges symmetrically disposed on opposite sides of the center of gravity (G) of the bar, the direction of the lines of current of a gauge of one pair being parallel to the bar axis and perpendicular to that of the other gauge of the same pair, the gauges being electrically connected together so as to form a Wheatstone bridge delivering a signal which is a function of the force (P) applied on the said end of the bar, the two gauges of one pair being adjacent and connected to each other in the Wheatstone bridge.

2. Force transducer according to claim 1, characterized in that the resistance gauges of a same pair ($B_1$, $B_2$; $B_3$, $B_4$) are formed from the same resistive alloy, remain contiguous during all stages of their manufacture and are simultaneously fixed on the bar 1.

3. Force transducer according to claim 1, characterized in that the resistance gauges ($R_1$, $R_2$) of two different pairs are each connected in series with an adjustable resistance ($R'_1$, $R'_2$) forming an angle equal to $\pi/4$ with respect to the longitudinal axis (X) of the bar (1) and with an adjustable resistance ($R''_1$, $R''_2$) forming an angle equal to $\pi/2$ with respect to the axis (X).

* * * * *